Patented June 19, 1923.

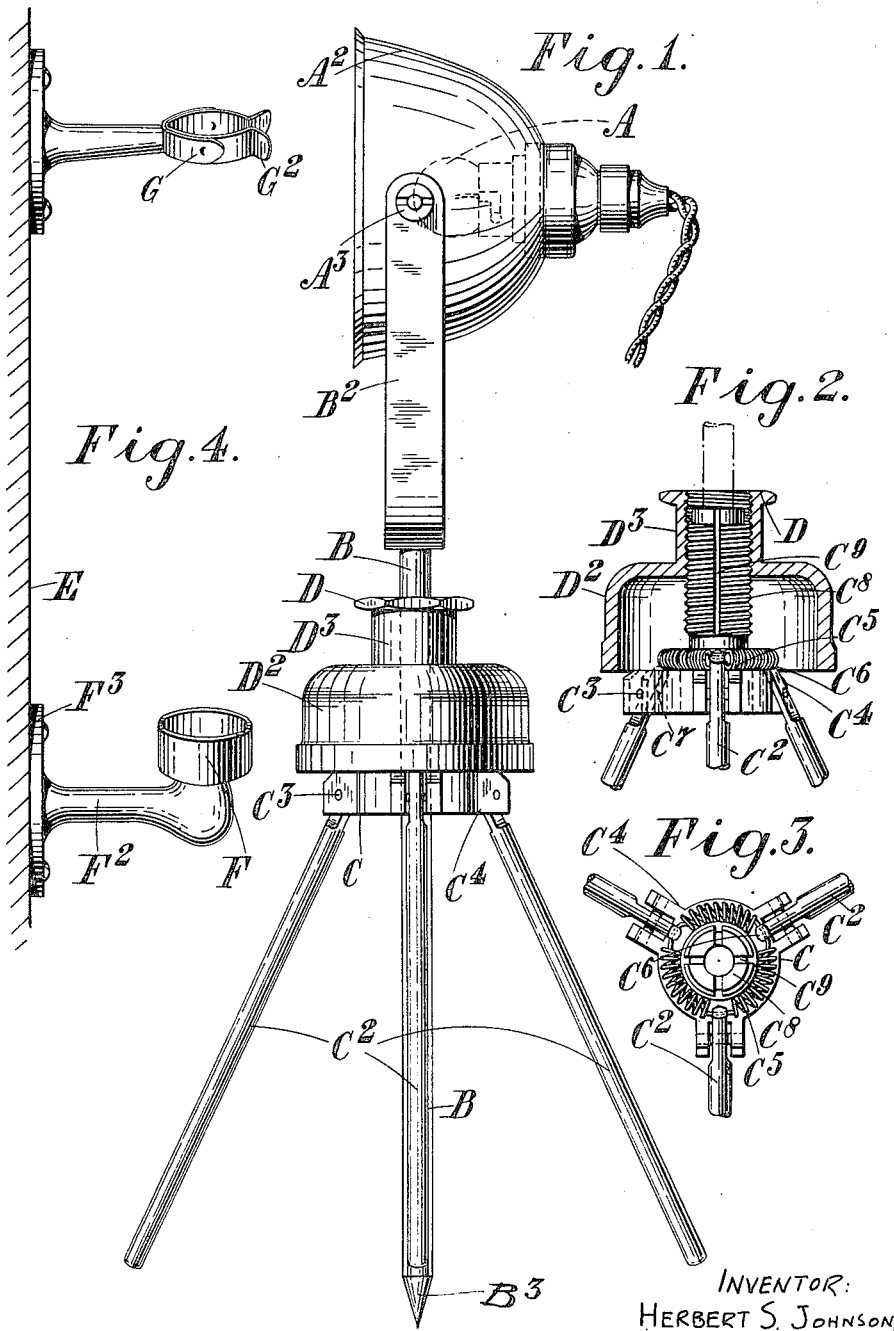

1,459,104

UNITED STATES PATENT OFFICE.

HERBERT STONE JOHNSON, OF NUNEATON, ENGLAND.

LAMP.

Application filed August 24, 1922. Serial No. 584,134.

*To all whom it may concern:*

Be it known that I, HERBERT STONE JOHNSON, a subject of the King of England, residing at Nuneaton, in the county of Warwick, England, have invented certain new and useful Improvements in Lamps, of which the following is a specification.

This invention relates to lamps such as are termed emergency lamps for use on motor vehicles or for other purposes, and it has for its object to provide in a simple and compact form, which can be easily stowed away, a lamp and a support therefor which can be rested upon any convenient object and is adjustable to shine its light in any desired direction, thereby avoiding the necessity of holding the lamp during an inspection or adjustment of any part requiring attention.

According to this invention, the lamp is adjustably supported upon a piller preferably having a pointed end to enable it to be stuck into a yielding substance, and this pillar in turn is vertically and rotationally adjustable on a collapsible support such as a tripod which has foldable legs and in use can be rested upon a support, and when closed can be carried by supporting lugs on a wall or on the dashboard of a motor vehicle or the like. To permit of the collapsing of the support, its legs are pivoted to the head, and they take up an acting position under a resilient pressure which allows them, when not in use, to be closed together.

In the accompanying drawings, which shew the manner of carrying out the invention, Figure 1 is an elevation of the complete lamp, Figure 2 is a sectional elevation of a part of the support therefor, Figure 3 is a plan view of Figure 2, for clearness omitting a part shown therein, and Figure 4 is a perspective view of a holder and clip for securing the lamp upon a wall or dashboard when not otherwise required.

The lamp A in the form of an electric bulb is mounted within and at the base of a cup $A^2$ forming both a shield and a reflector. The cup, by means of trunnion bearings $A^3$ or the like, is supported between jaws $B^2$ provided at the upper end of a pillar B so that thereby it can be tilted upwardly or downwardly relatively to the pillar.

This pillar, which is pointed at its lower end $B^3$, when not otherwise supported can be stuck into the ground or into a block of wood or other yielding material as may be most convenient, and thus will form a support for the lamp which can then be adjusted to shine in the desired direction.

To carry the pillar, a foldable support, such as a tripod is provided, the legs $C^2$ of which are hinged at $C^3$ to lugs $C^4$ provided on the tripod head C and are normally spread laterally under the action of a coil spring $C^5$ which engages hooks $C^6$ formed on parts of the legs extending beyond the hinge $C^3$. The spread of the legs is limited by contact of their extended part with the tripod at $C^7$. Through the head of this tripod the pillar B for the lamp extends, a sleeve $C^8$ integral with or attached to the head being provided for its reception. This sleeve is externally screw-threaded and is split longitudinally at $C^9$ and is engaged by a nut D adapted to compress its sides against the sliding pillar to lock it after making a desired adjustment of the latter's vertical and angular position about its axis.

The nut D which compresses the split sleeve preferably forms part of a cover or cap $D^2$ adapted to enclose within it the tripod head C and spring $C^5$ and thus to provide a neat appearance.

Instead of the coil spring $C^5$ a split ring or other resilient device may be employed which is adapted collectively to grip the legs $C^2$ so as to spread them laterally to an extent limited by contact of some part of the leg with its support, thus ensuring the stability of the legs when extended.

To provide a simple method for stowing away the lamp when carried upon a motor vehicle and not in use, it may be mounted upon the dashboard E of the car, and for this purpose a cup-shaped attachment F supported by an arm $F^2$ is secured by the flange $F^3$ to the dashboard and is adapted to receive within it the acting ends of the tripod legs $C^2$ and also the pointed end $B^3$ of the pillar B when the legs are closed together. A central hole may be drilled in the base of the cup to receive and locate the pointed portion of the pillar. Above this cup-shaped attachment F is located upon the dashboard a spring clip G of a known kind adapted resiliently to grip an object which is thrust into it between its jaws $G^2$. This spring clip is adapted to embrace a neck portion $D^3$ formed upon the nut D which closes the split sleeve $C^8$ securing the adjustable pillar B, and thus permits of quickly engaging the complete lamp or disengaging it from its support.

It will be seen that the manner in which the lamp is thus held ensures it against rattling and enables it to be stowed into a comparatively small space, and when in use the lamp can be rapidly set up to shine upon any desired object owing to the provision of adjustment means for height, and for positions about a vertical and a horizontal axis. In making an adjustment of the height or position about the vertical axis, no spanner is required to manipulate the nut, as the size of the cover portion $D^2$ attached to it provides sufficient grip for the fingers without other aid. Furthermore, where convenient or desirable the pillar carrying the lamp may be removed from the tripod portion, and can then be located in various positions by sticking its pointed end into any suitable or sufficiently soft part of the ground, or into a gate post or the like.

What I claim as my invention and desire to secure by Letters Patent of the United States is:—

1. The combination of a lamp, a pillar carrying said lamp, a head, legs pivoted thereto, a spring acting upon said legs normally to hold them in the extended position, stops adapted to limit the extension of said legs, a socket upon said head through which said pillar extends and is endwise free, and a clamping device for securing said pillar at a desired position in said socket, substantially as set forth.

2. The combination of a lamp, a pillar carrying said lamp, a head, legs pivoted thereto, a spring acting upon said legs normally to hold them in the extended position, stops adapted to limit the extension of said legs, a split socket upon said head through which said pillar extends, and a nut screw-threaded upon said socket adapted to compress the split sides thereof against said pillar, substantially as set forth.

3. The combination of a lamp, a pillar upon which said lamp is tiltably mounted, a head, legs pivoted thereto, a spring acting upon said legs normally to hold them in the extended position, stops adapted to limit the extension of said legs, a split socket upon said head through which said pillar extends, and a nut screw-threaded upon said socket adapted to compress the split sides thereof against said pillar, substantially as set forth.

4. The combination of a lamp, a pillar upon which said lamp is tiltably mounted, a head, legs pivoted thereto, a spring acting upon said legs normally to hold them in the extended position, stops adapted to limit the extension of said legs, a split socket upon said head through which said pillar extends, and a nut screw-threaded upon said socket adapted to compress the split sides thereof upon said pillar and provided with a cup adapted to surround the head of the foldable support to enclose the springs and the pivoted ends of the legs, substantially as set forth.

In testimony whereof I have signed my name to this specification in the presence of two subscribing witnesses.

HERBERT STONE JOHNSON.

Witnesses:
  JOHN ARKLE,
  ANNIE L. WADE.